(12) United States Patent
Komiya

(10) Patent No.: US 8,605,357 B2
(45) Date of Patent: Dec. 10, 2013

(54) WAVELENGTH SELECTIVE SWITCH AND OPTICAL TRANSFER DEVICE

(75) Inventor: Shinji Komiya, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 448 days.

(21) Appl. No.: 12/901,848

(22) Filed: Oct. 11, 2010

(65) Prior Publication Data

US 2011/0085222 A1    Apr. 14, 2011

(30) Foreign Application Priority Data

Oct. 14, 2009 (JP) .................................. 2009-237167

(51) Int. Cl.
  *G02B 5/30*    (2006.01)
(52) U.S. Cl.
  CPC .................................... *G02B 5/3083* (2013.01)
  USPC .................................................... 359/484.06
(58) Field of Classification Search
  None
  See application file for complete search history.

(56) References Cited

U.S. PATENT DOCUMENTS 6,625,346 B2  9/2003  Wilde
6,687,431 B2  2/2004  Chen et al.

FOREIGN PATENT DOCUMENTS

JP    2004-532544    10/2004
JP    2005-70546     3/2005
WO    WO 02/075410   9/2002

*Primary Examiner* — Derek S Chapel
(74) *Attorney, Agent, or Firm* — Fujitsu Patent Center

(57) ABSTRACT

A wavelength selective switch includes a polarization controller to control a polarization controller configured to control a polarization plane of a first optical signal as wavelength-multiplexed light input through a first input port, and control a polarization plane of a second optical signal as wavelength-multiplexed light input through a second input port such that the polarization plane of the second optical signal is aligned in a direction perpendicular to the polarization plane of the first optical signal, a demultiplexer to demultiplex optical signals multiplexed in the first and the second optical signals, a polarization separator to separate, an optical collector to collect the optical signals separated by the polarization separator, an optical signal reflector to reflect each of the optical signals collected by the optical collector; and a reflection controller to control the optical signal reflector in accordance with an incident position of the optical signal.

12 Claims, 19 Drawing Sheets

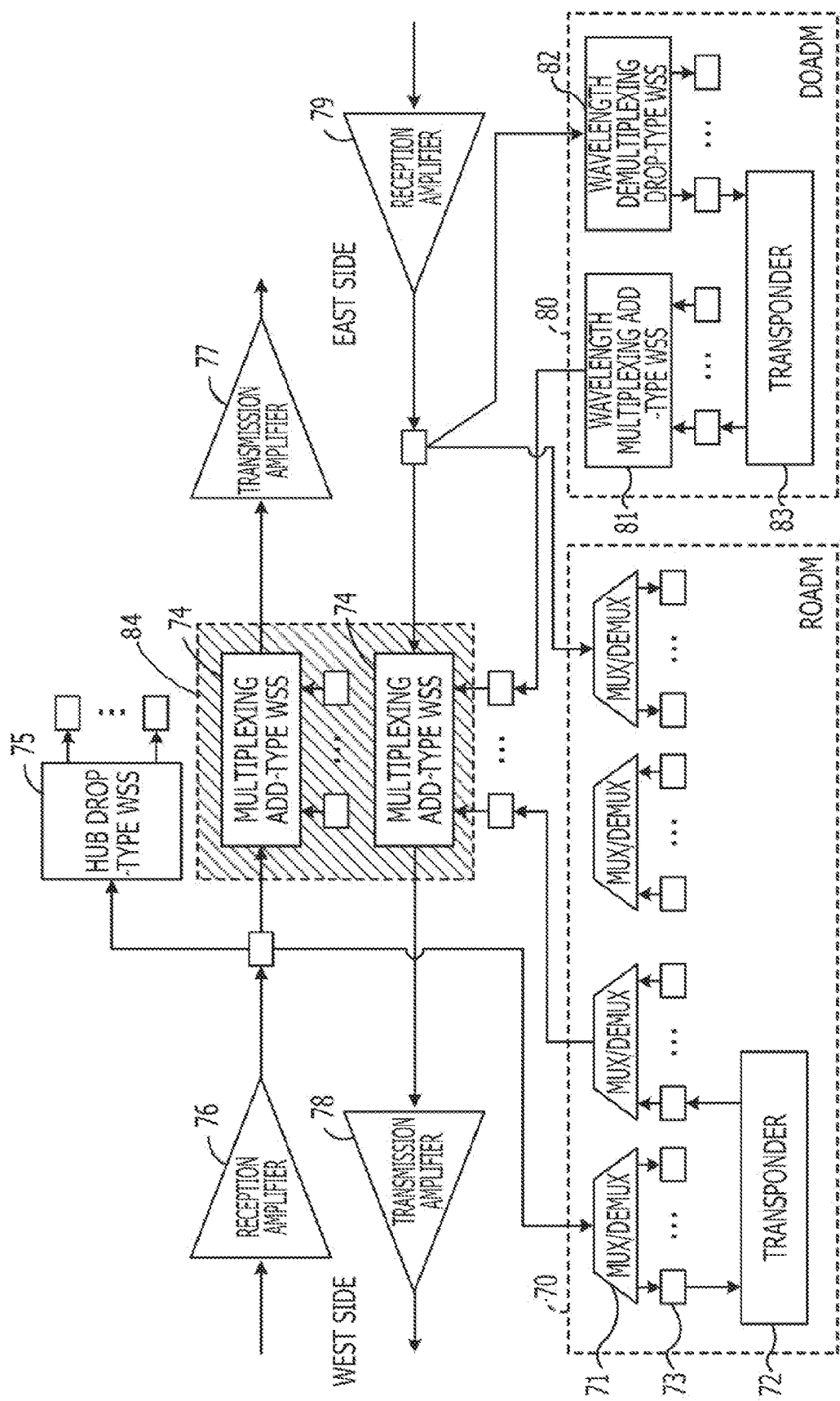

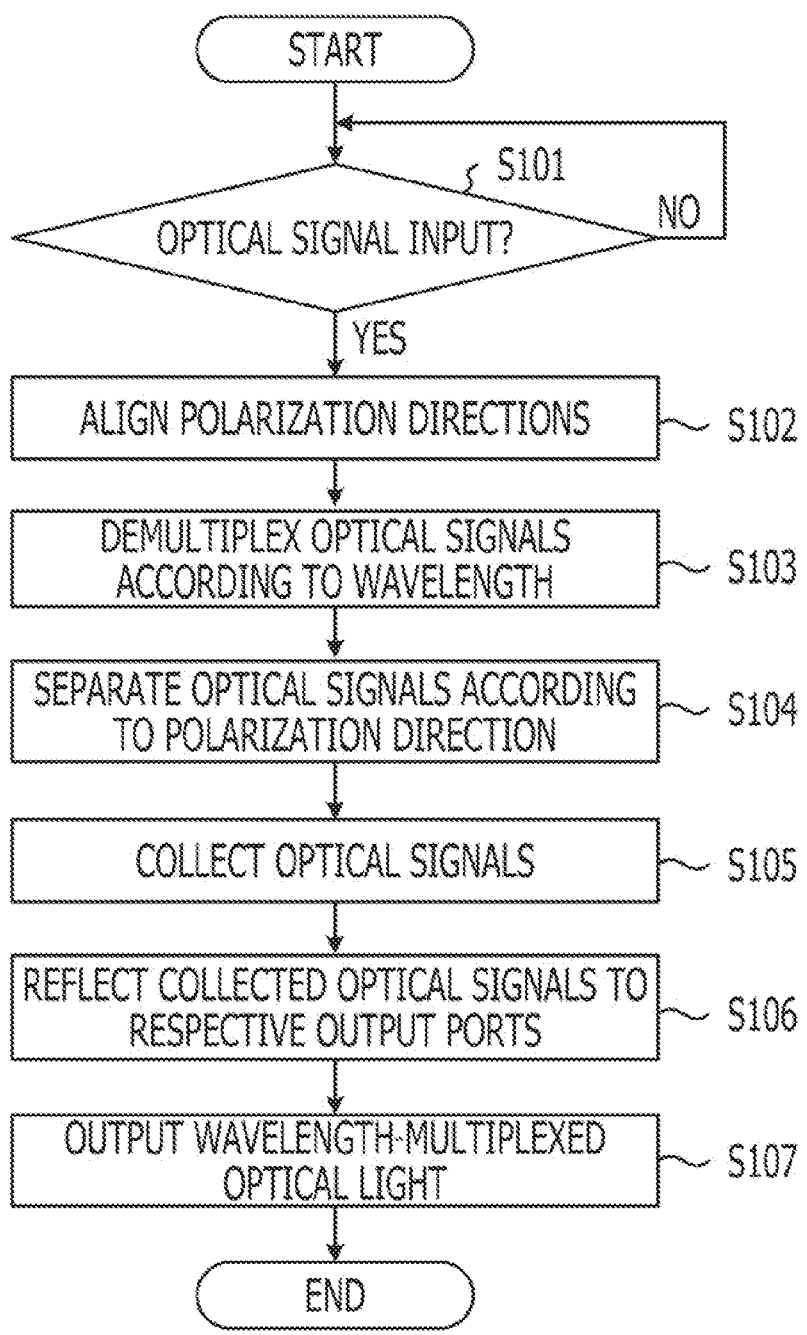

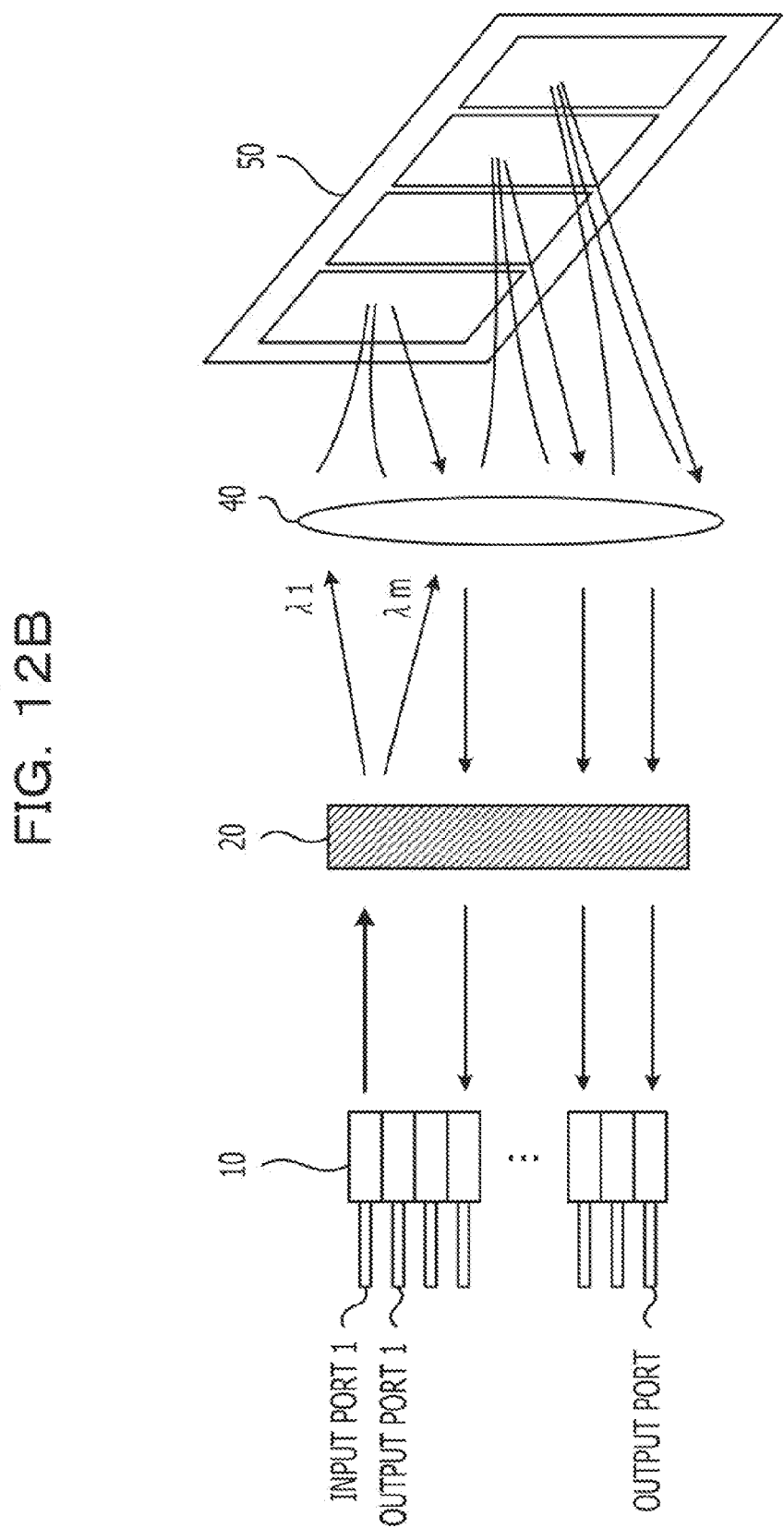

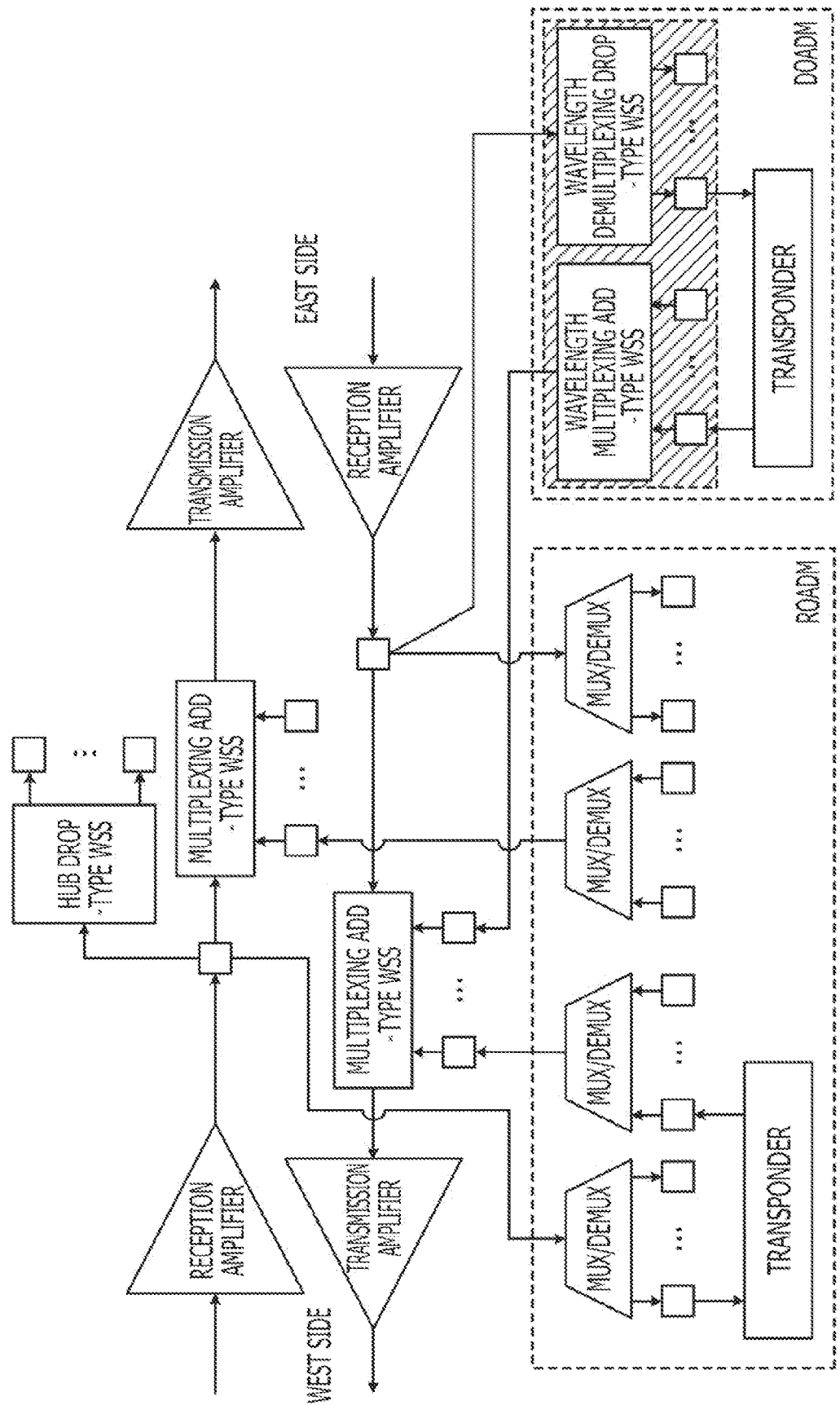

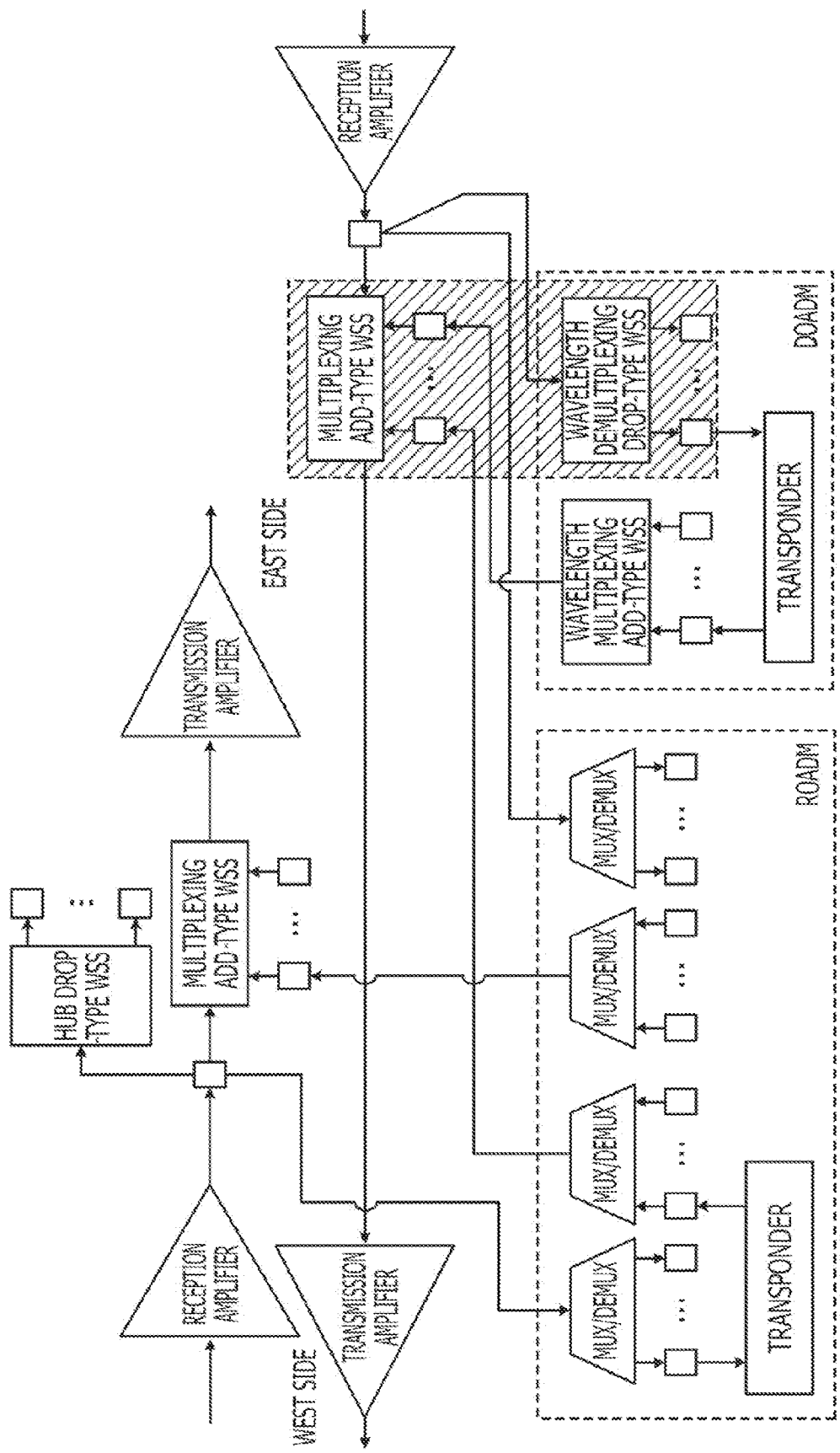

WAVELENGTH SELECTIVE SWITCH AND OPTICAL TRANSFER DEVICE

CROSS-REFERENCE TO RELATED APPLICATIONS

This application is based upon and claims the benefit of priority of the prior Japanese Patent Application No. 2009-237167, filed on Oct. 14, 2009, the entire contents of which are incorporated herein by reference.

FIELD

The embodiments discussed herein are related to a wavelength selective switch and an optical transfer device.

BACKGROUND

An optical communication system (hereinafter referred to as a WDM communication system), based on wavelength division multiplexing (WDM), communicates a large amount of data to satisfy increasing communication demands. WDM is a communication means that concurrently transmits different pieces of information by multiplexing optical signals having a plurality of different wavelengths.

The WDM communication system includes a network optical transfer device having a wavelength selective switch and transmits a plurality of pieces of information to desired output destinations. For example, the wavelength selective switch multiplexes received optical signals, and demultiplexes the multiplexed optical signals into optical signals of a given wavelength. The wavelength selective switch thus switches transfer paths of information.

FIG. 15A is a side view of a wavelength selective switch of related art. As illustrated in the side view of FIG. 15A, the wavelength selective switch includes a plurality of input ports, each port receiving an optical signal, and a plurality of output ports, each port outputting an optical signal. The wavelength selective switch includes a first optical system 100. The first optical system 100 includes a lens which collimates an optical signal input via an input port and an optical signal to be output via an output port.

FIG. 15B is a top view of the wavelength selective switch of related art. Upon receiving multiplexed optical signals having m wavelengths of "wavelengths λ1-λm" as illustrated in FIG. 15B, the first optical system 100 in the wavelength selective switch collimates the optical signal input via the input port, and directs the optical signal to a wavelength demultiplexer 200. The wavelength demultiplexer 200 includes a diffraction grating, and demultiplexes the input optical signal according to wavelength. More specifically, the wavelength demultiplexer 200 wavelength-demultiplexes the optical signal into m optical signals in an x axis direction. A second optical system 400 collects each optical signal demultiplexed by the wavelength demultiplexer 200 according to wavelength, and directs the optical signals to a micro-electromechanical system (MEMS) array 500. The MEMS array 500 includes m MEMS mirrors corresponding to the wavelengths.

The MEMS array 500 rotates the MEMS mirror about the x axis. The MEMS array 500 reflects an optical signal by changing the mirror's angle so that the optical signal of each wavelength is output from a given output port. The second optical system 400 in the wavelength selective switch collimates the optical signal reflected by the MEMS mirror, and outputs the collimated optical signal via a given output port through the wavelength demultiplexer 200. The wavelength selective switch may be set to output the optical signal at a given loss on a per-wavelength basis by rotating the MEMS mirror by a slight angle around the X axis or the Y axis. Solid lines represent optical paths of the optical signals, and double-arrow-headed lines represent the direction of travel of light.

Referring to FIGS. 15A and 15B, the wavelength selective switch includes a plurality of input ports and a plurality of output ports, and a known wavelength selective switch having a single input port and a single output port. Also known is a wavelength selective switch having a single input port and a plurality of output ports (drop-type wavelength selective switch). Another known wavelength selective switch includes a plurality of input ports and a single output port (add-type wavelength selective switch). Still another known wavelength selective switch includes no MEMS mirror and switches output ports by switching polarization directions of optical signals on a per wavelength basis.

A plurality of wavelength selective switches are typically used in an optical transfer device over a network. Since the wavelength selective switch is fabricated of a spatial optical system, a device including a plurality of wavelength selective switches is difficult to miniaturize. If a reconfigurable optical add/drop multiplexer (ROADM) is used in an optical transfer device at a branch point over a ring network, an add-type wavelength selective switch is used for each of the east-west and west-east directions. If a dynamic optical add/drop multiplexer (DOADM) adding or dropping an optical signal having a given wavelength is used, one add-type wavelength selective switch and one drop-type wavelength selective switch are used.

SUMMARY

According to an aspect of the disclosed embodiments, a wavelength selective switch includes, a polarization controller configured to control a polarization plane of a first optical signal as wavelength-multiplexed light input through a first input port, and to control a polarization plane of a second optical signal as wavelength-multiplexed light input through a second input port such that the polarization plane of the second optical signal is aligned in a direction perpendicular to the polarization plane of the first optical signal, a wavelength-demultiplexer configured to wavelength-demultiplex optical signals wavelength-multiplexed in the first optical signal and the second optical signal, the direction of the polarization plane of which is controlled by the polarization controller, a polarization separator configured to separate, according to the direction of the polarization plane, the optical signals wavelength-demultiplexed by the wavelength-demultiplexer, an optical collector configured to collect the optical signals separated by the polarization separator, an optical signal reflector configured to reflect the optical signals collected by the optical collector, and a reflection controller configured to control the optical signal reflector in accordance with an incident position of the optical signal incident on the optical signal reflector such that the optical signal wavelength-multiplexed in the first optical signal is output from a first output port corresponding to the first input port and such that the optical signal wavelength-multiplexed in the second optical signal is output from a second output port corresponding to the second input port.

The object and advantages of the disclosed embodiments will be realized and attained by means of the elements and combinations particularly pointed out in the claims.

It is to be understood that both the foregoing general description and the following detailed description are exemplary and explanatory and are not restrictive of the disclosed embodiments, as claimed.

BRIEF DESCRIPTION OF THE DRAWINGS

FIGS. 3A and 3B illustrate a mounting position of the wavelength selective switch of the second embodiment.

FIG. 9 illustrates a process of the wavelength selective switch of the second embodiment.

FIGS. 12A and 12B illustrate a mounting position of a wavelength selective switch of a third embodiment.

FIGS. 14A-14C illustrate mounting positions of the wavelength selective switch.

DESCRIPTION OF EMBODIMENTS

Embodiments of a wavelength selective switch and an optical transfer device of the present application are described in detail below with reference to the accompanying drawings.

Figure 1:
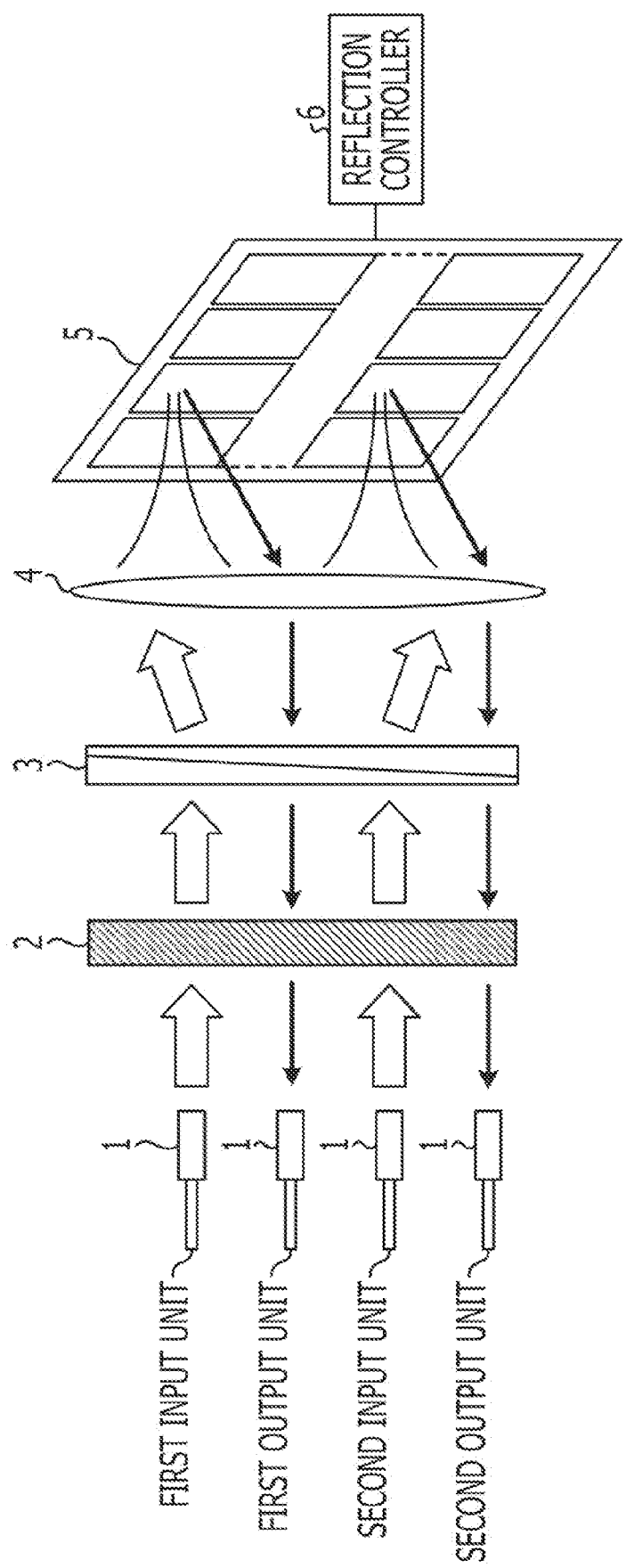
FIG. 1 illustrates a structure of a wavelength selective switch of a first embodiment.

A structure of the wavelength selective switch of a first embodiment is described with reference to FIG. 1. FIG. 1 illustrates the structure of the wavelength selective switch of the first embodiment. As illustrated in FIG. 1, the wavelength selective switch includes polarization controller 1, wavelength demultiplexer 2, polarization separator 3, optical collector 4, optical signal reflector 5, and reflection controller 6. The wavelength selective switch outputs an optical signal, input via a first input unit or a second input unit, via first output unit or a second output unit, respectively.

The polarization controller 1 controls a polarization plane of a first optical signal as wavelength-multiplexed light input via the first input unit such that the polarization plate of the first optical signal is aligned in a specific direction, and controls a polarization plane of a second optical signal as wavelength-multiplexed light input via the second input unit such that the polarization plate of the second optical signal is aligned in a direction perpendicular to the specific direction.

The wavelength demultiplexer 2 wavelength-demultiplexes the optical path of the optical signals multiplexed in the first optical signal and the second optical signal, the polarization direction of which is controlled by the polarization controller 1, such that the optical signals are assigned to respective optical paths. The polarization separator 3 separates the optical signals, demultiplexed according to wavelength by the wavelength demultiplexer 2, into different directions in response to the directions of the polarization planes.

The optical collector 4 collects the optical signals separated into the different directions by the polarization separator 3, and the signal reflector 5 reflects the optical signals collected by the polarization separator 3. In response to the incident position of the optical signal incident on the signal reflector 5, the reflection controller 6 controls the signal reflector 5 such that the optical signal multiplexed in the first optical signal is output from the first output unit corresponding to the first input unit. The reflection controller 6 controls the signal reflector 5 such that the optical signal multiplexed in the second optical signal is output from the second output unit corresponding to the second input unit.

In accordance with the first embodiment as described above, the first optical signal input via the first input unit and the second optical signal input via the second input unit are reliably separated from each other by the single wavelength demultiplexer 2 and the single optical collector 4. Two wavelength selective switches can thus be integrated, and a device including a plurality of wavelength selective switches can be miniaturized.

Figure 2:
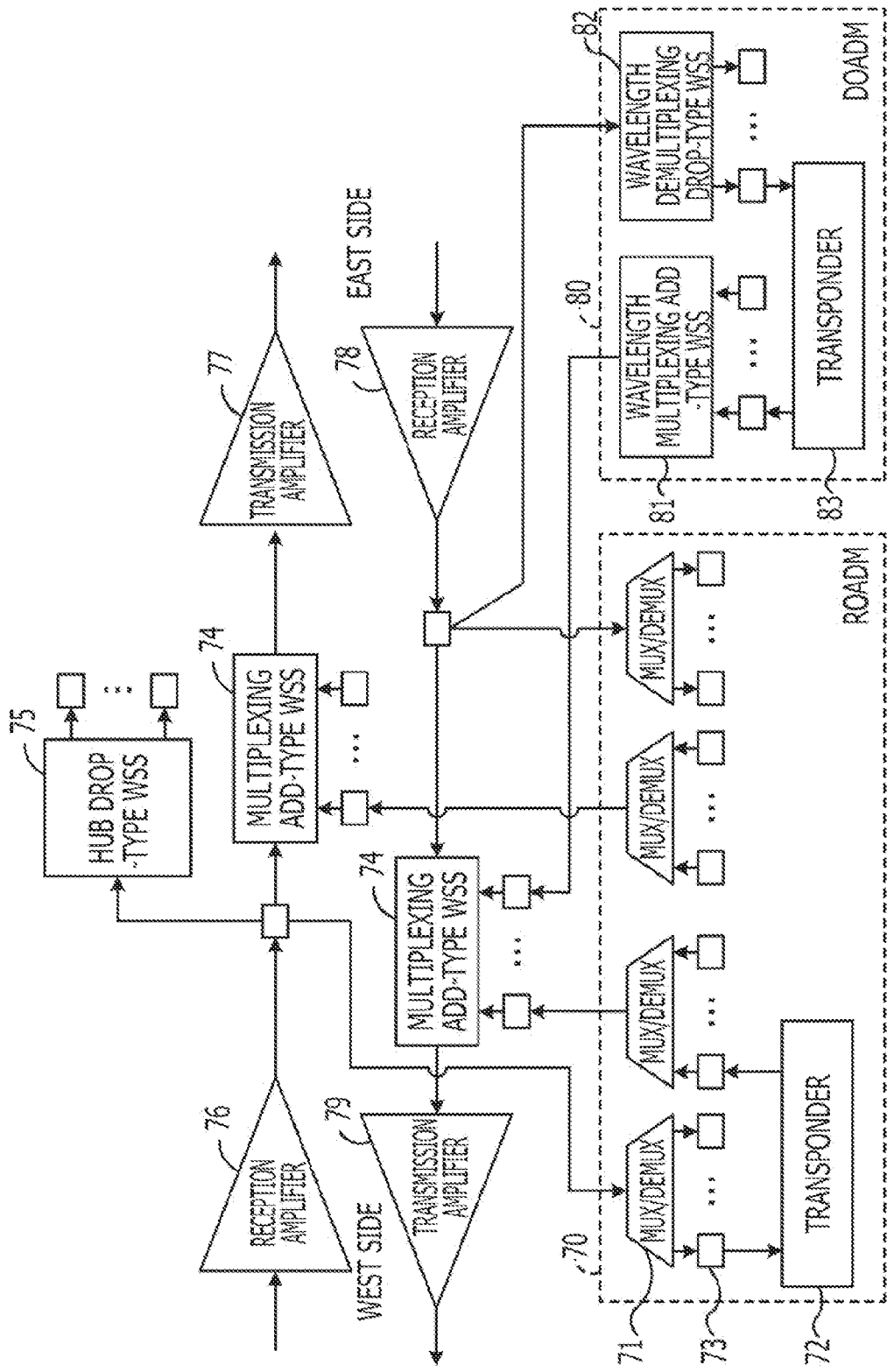
FIG. 2 illustrates an optical transfer device including a wavelength selective switch of a second embodiment.
Figure 3B:
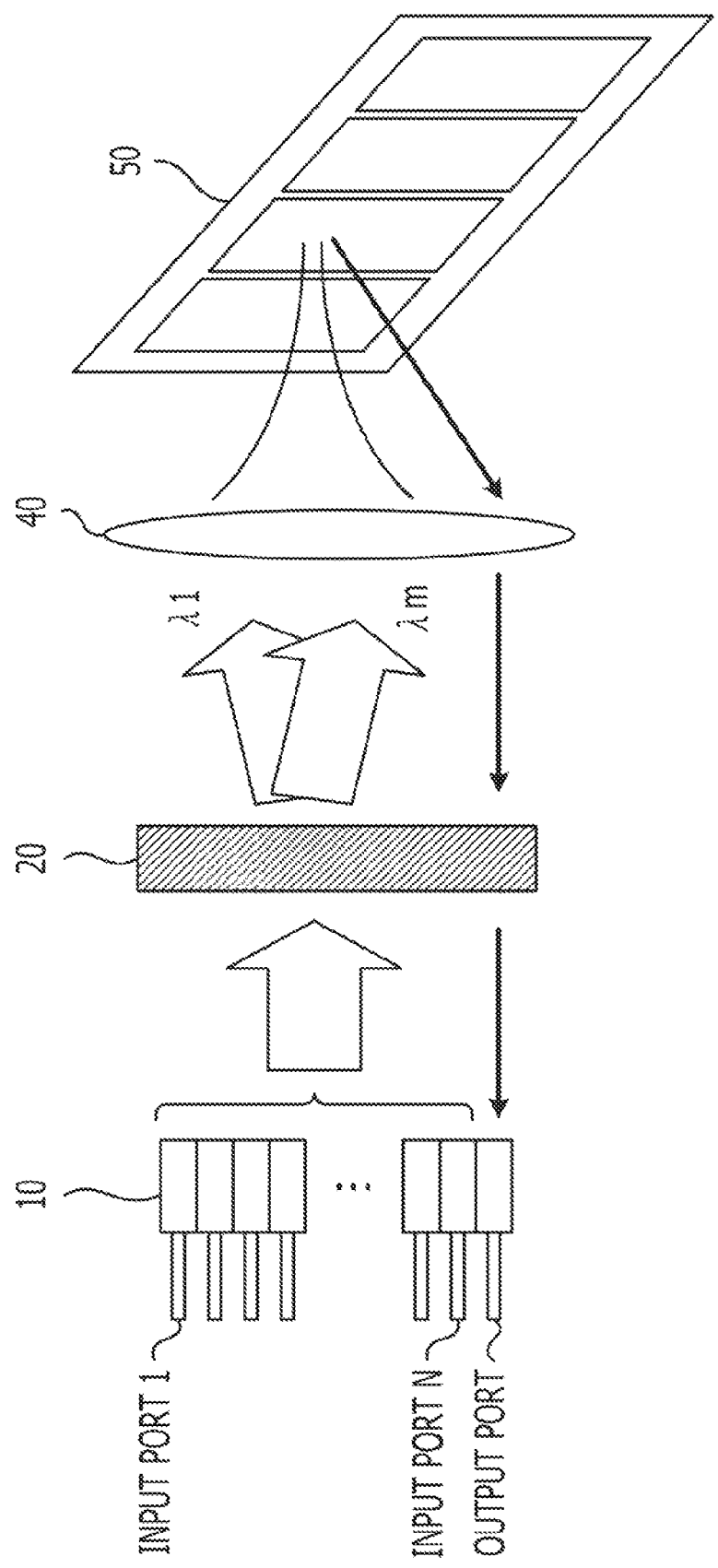

Structure of the wavelength selective switch of the second embodiment:

An optical transfer device including a wavelength selective switch of a second embodiment is described below with reference to FIGS. 2 and 3A and 3B. The structure of the wavelength selective switch is then described with reference to FIGS. 4-8A and 8B. FIG. 2 illustrates the optical transfer device including the wavelength selective switch of the second embodiment.

The optical transfer device of FIG. 2 is installed at a branch point over a ring network, and transfers a multiplexed optical signal including a variety of information from an east side to a west side or from the west side to the east side. Referring to FIG. 2, the optical transfer device includes a reconfigurable optical add/drop multiplexer (ROADM) 70, and a dynamic optical add/drop multiplexer (DOADM) 80. The ROADM 70 and the DOADM 80 in the optical transfer device transmits information from a terminal (not illustrated) to a network, or from the terminal (not illustrated) to the network.

The wavelength selective switch (WSS) in the optical transfer device multiplexes a plurality of optical signals and demultiplexes the multiplexed optical signal into optical signals having a given wavelength. The optical transfer device switches transfer paths of information in this way. For example, as illustrated in FIG. 2, the optical transfer device includes a multiplexing add-type WSS 74, a hub drop-type WSS 75, a wavelength-multiplexing add-type WSS 81, and a wavelength-demultiplexing drop-type WSS 82.

As illustrated in FIG. 2, the multiplexing add-type WSS 74 multiplexes an optical signal having a specific wavelength transferred via the ROADM 70 onto an optical signal received by a reception amplifier 76 at the west side of the network, and then transfers the multiplexed optical signal to a transmission amplifier 77 at the east side. The transmission amplifier 77 transmits the optical signal multiplexed by the multiplexing add-type WSS 74 to the east side of the network.

The other multiplexing add-type WSS 74 multiplexes an optical signal having a specific wavelength transferred from one of the ROADM 70 and the DOADM 80 onto an optical signal received via a reception amplifier 79 at the east side of the network as illustrated in FIG. 2, and transfers the multiplexed optical signal to a transmission amplifier 78 at the west side. The transmission amplifier 79 at the west side transmits the optical signal multiplexed by the multiplexing add-type WSS 74 to the west side of the network.

As illustrated in FIG. 2, the hub drop-type WSS 75 demultiplexes an optical signal having a specific wavelength to be transferred to a hub network from the optical signal received by the reception amplifier 76 at the west side of the network.

The ROADM 70, which is used to exchange an optical signal between a terminal (not illustrated) and a network, multiplexes or demultiplexes an optical signal having a specific wavelength to be transferred to the multiplexing add-type WSS 74.

As illustrated in FIG. 2, for example, the ROADM 70 includes a transponder 72, drop switches/add switches 73, and multiplexers (MUX)/demultiplexers (DEMUX) 71. If information received from the terminal (not illustrated) is transferred to the network, the transponder 72 converts the information received from the terminal in terms of signal rate, and error-corrects the information in accordance with a forward error correction (FEC) code. The transponder 72 modulates the optical signal with a laser into a given wavelength, and then outputs the resulting optical signal to MUX/DEMUX 71.

The MUX/DEMUX 71 may multiplex optical signals of a plurality of specific wavelengths into one optical signal, or demultiplex the multiplexed optical signal into the optical signal having a particular wavelength. For example, the MUX/DEMUX 71 multiplexes, into one optical signal, optical signals of several wavelengths from among the optical signals input from the transponder 72, and transfers to the multiplexing add-type WSS 74 the demultiplexed optical signal.

If information is transferred from the network to the terminal (not illustrated), the MUX/DEMUX 71 demultiplexes the multiplexed optical signal into the optical signal having a particular wavelength, and then transfers the demultiplexed optical signal to the transponder 72. The transponder 72 error-corrects the optical signal in accordance with the FEC code, and then outputs the corrected optical signal to the terminal (not illustrated).

Similarly, the DOADM 80 transfers information between a terminal (not illustrated) and a network via a transponder 83. Referring to FIG. 2, the DOADM 80 includes the wavelength-multiplexing add-type WSS 81 and the wavelength-demultiplexing drop-type WSS 82. The DOADM 80 may multiplex an optical signal having a given wavelength from among the optical signals output by the transponder 83, and demultiplex an optical signal having a given wavelength from the multiplexed optical signal.

As described above, the optical transfer device switches the transfer paths of information at the branch point over the network using a variety of WSS and WSS. In accordance with the present embodiment, costs for the wavelength selective switch are reduced by integrating two wavelength selective switches. The mounting position of the wavelength selective switch of the second embodiment is discussed with reference to FIGS. 3A and 3B. FIGS. 3A and 3B illustrate the mounting position of the wavelength selective switch of the second embodiment.

The wavelength selective switch of the second embodiment is mounted at the positions of the multiplexing add-type WSS74 and WSS74 in the optical transfer device of FIG. 2 and FIG. 3A. In accordance with the second embodiment, a multiplexing add-type WSS1 and a multiplexing add-type WSS2 are integrated as a WSS84 such that each of the multiplexing add-type WSS74 and WSS74 performs the function thereof.

The add-type WSS at the mounting position of the wavelength selective switch of the second embodiment is discussed. As illustrated in FIG. 3B, the add-type WSS includes a plurality of input ports, i.e., input ports 1-N. Upon receiving the optical signals having m wavelengths of λ1-λm, the add-type WSS collimates the optical signals input via the input ports with a first optical system, and inputs the collimated optical signals to a wavelength demultiplexer. The wavelength demultiplexer in the wavelength selective switch demultiplexes the optical signals according to wavelength. A second optical system in the wavelength selective switch collects the optical signals demultiplexed according to wavelength. The wavelength selective switch thus causes the collected optical signals to be incident on an MEMS array having an MEMS mirror. The wavelength selective switch adjusts an angle of the MEMS mirror such that the optical signals having m wavelengths are multiplexed and output from a single output port. The wavelength selective switch thus reflects the optical signals.

Figure 4:
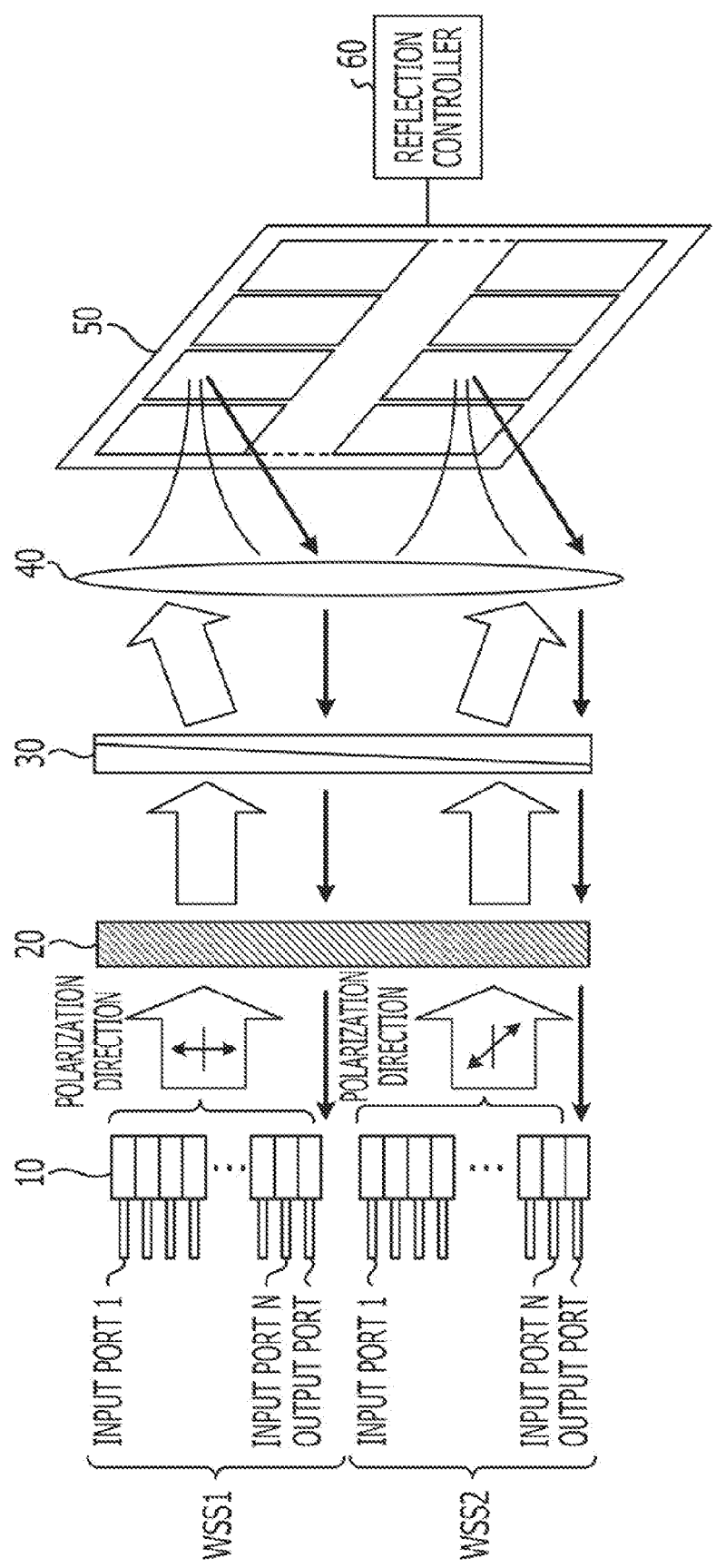
FIG. 4 illustrates the wavelength selective switch of the second embodiment.

The structure of the wavelength selective switch of the second embodiment is discussed below. FIG. 4 illustrates the structure of the wavelength selective switch of the second embodiment. As illustrated in FIG. 4, the wavelength selective switch includes WSS1 having the function of the multiplexing add-type WSS1 and WSS2 having the function of the multiplexing add-type WSS2. Each of WSS1 and WSS2 includes a plurality of input ports 1-N and a single output port with each port including a first optical system 10.

The wavelength selective switch includes wavelength demultiplexer 20, third optical system 30, second optical system 40, optical signal reflector 50, and reflection controller 60. The input ports 1-N of WSS1 receive optical signals transferred via specific transfer paths. For example, the input ports 1-N of WSS1 receive optical signals transferred from the west side of the network of FIG. 3A.

The input ports 1-N of WSS2 receive optical signals transferred via transfer paths different from the transfer paths through which the input ports of WSS1 receive the optical signals. For example, the input ports 1-N of WSS2 receive the optical signals transferred from the east side of the network or the optical signals transferred from the ROADM.

The output port of WSS1 outputs the multiplexed optical signal to a specific output destination. For example, the output port of WSS1 outputs the multiplexed optical signal to the east side of the network of FIG. 3A. The output port of WSS2 outputs the multiplexed optical signal to an output destination different from the output destination of the output port of WSS1. For example, the output port of WSS2 outputs the multiplexed optical signal to the west side of the network of FIG. 3A.

The first optical system 10 controls the polarization plane of the first optical signal as wavelength-multiplexed light input via the first input unit such that the polarization plane of the first optical signal is aligned in a specific direction, and controls the polarization plane of the second optical signal as wavelength-multiplexed light input via the second input unit such that the polarization plane of the second optical signal is aligned in a direction perpendicular to the specific direction. More specifically, the first optical system 10 controls the directions of electric fields of the first optical signals input via the input ports 1-N of WSS1 such that the directions of the electric fields of the first optical signals are aligned in the specific direction. Also, the first optical system 10 controls the directions of electric fields of the second optical signals input via the input ports 1-N of WSS2 such that the directions of the electric fields of the second optical signals are aligned in the direction perpendicular to the direction of the electric fields of the optical signal input via the input port of WSS1. In the discussion that follows, the direction of an electric field is referred to as a polarization direction.

Figure 5A:
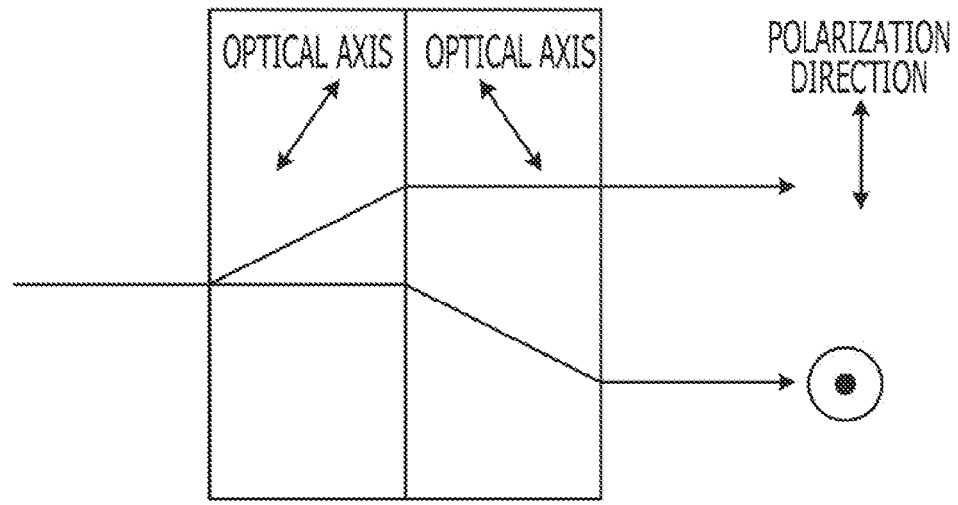
FIGS. 5A and 5B illustrate a first optical system.
Figure 5B:
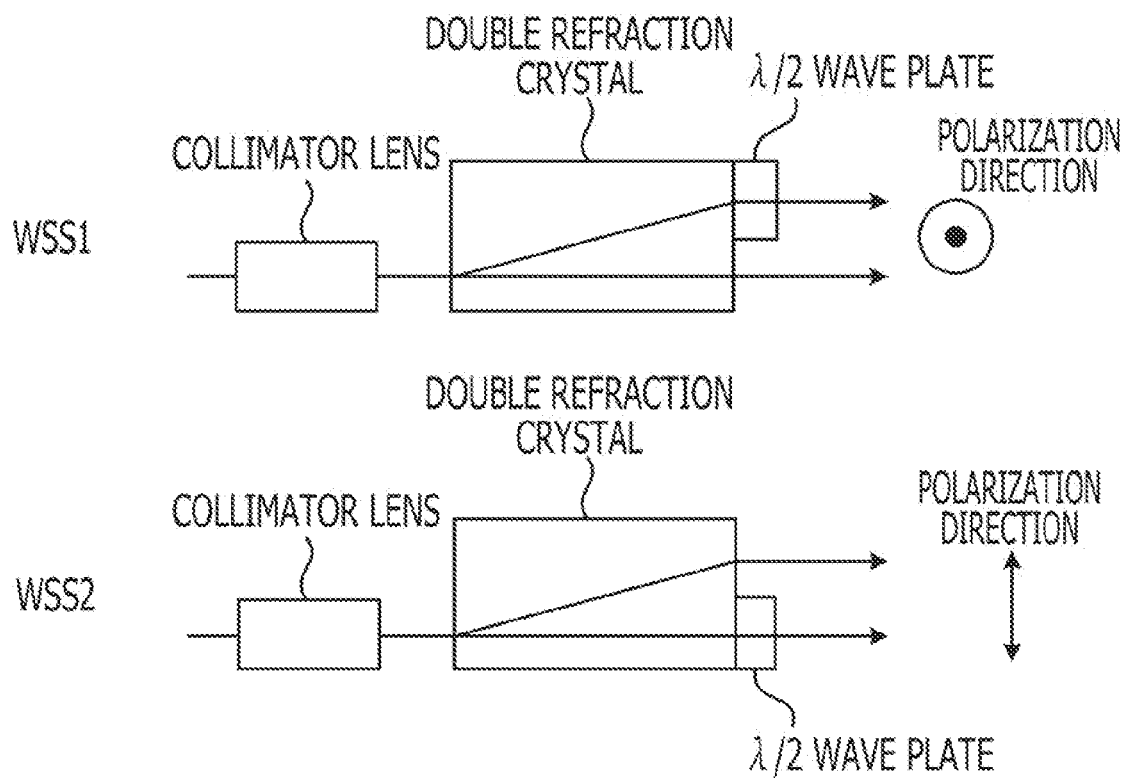

A control process of the first optical system 10 for controlling the polarization direction of the optical signal is described below. FIGS. 5A and 5B illustrate the first optical system 10. FIGS. 5A and 5B are top views of the first optical system. The first optical system 10 of FIG. 5A includes a double refraction crystal structure including two crystals having different polarization axes as polarizers. The first optical system 10 controls the polarization direction of the optical signal such that the polarization direction is parallel to or vertical to the ground. As illustrated in FIG. 5B, the location of the λ/2 (half-wave) plate in the first optical system 10 is different between WSS1 and WSS2 such that the polarization direction of the optical signal input via each input port of WSS1 and the polarization direction of the optical signal input via each input port of WSS2 are perpendicular to each other.

The first optical system of WSS1 as illustrated in FIG. 5B includes the λ/2 plate. The λ/2 plate is arranged at a location where an optical signal having the polarization direction controlled to be parallel to the ground is output from among the optical signals input to the double refraction crystal via a collimator lens and controlled in the polarization directions thereof. The optical signal having the polarization direction parallel to the ground is rotated 90 degrees in the polarization direction, thereby having the polarization direction vertical to the ground. As illustrated in FIG. 5B, the polarization directions of all the optical signals transmitted through the first optical system 10 of WSS1 are thus vertical to the ground.

The first optical system 10 of WSS2 as illustrated in FIG. 5B includes the λ/2 plate. The λ/2 plate is arranged at a location where an optical signal, having the polarization direction controlled so as to be vertical to the ground, is output from among the optical signals input to the double refraction crystal via a collimator lens and controlled in the polarization directions. The optical signal having the polarization direction vertical to the ground is rotated 90 degrees in the polarization direction, thereby having the polarization direction parallel to the ground. As illustrated in FIG. 5B, the polarization directions of all the optical signals transmitted through the first optical system 10 of WSS2 are thus parallel to the ground.

Returning to the discussion of the wavelength selective switch of FIG. 4, the wavelength demultiplexer 20 demultiplexes, according to wavelength, the optical path of the optical signals, multiplexed in the first optical signal and the second optical signal and having the polarization direction thereof controlled by the first optical system 10. More specifically, the wavelength demultiplexer 20 having one of a transmission grating and a reflection grating demultiplexes the optical path of the first optical signals input via the input port of WSS1 and aligned in the polarization direction into different directions according to wavelength. The wavelength demultiplexer 20 demultiplexes the optical path of the second optical signals input via the input port of WSS2 and aligned in the polarization direction into different directions according to wavelength.

Figure 6A:
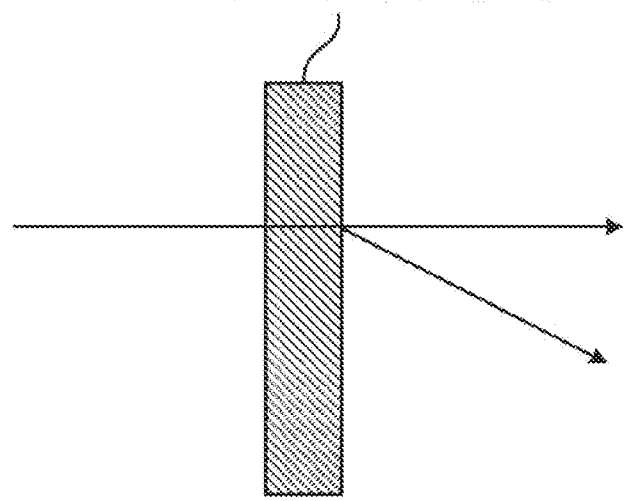
FIGS. 6A and 6B illustrate a wavelength demultiplexer.
Figure 6B:
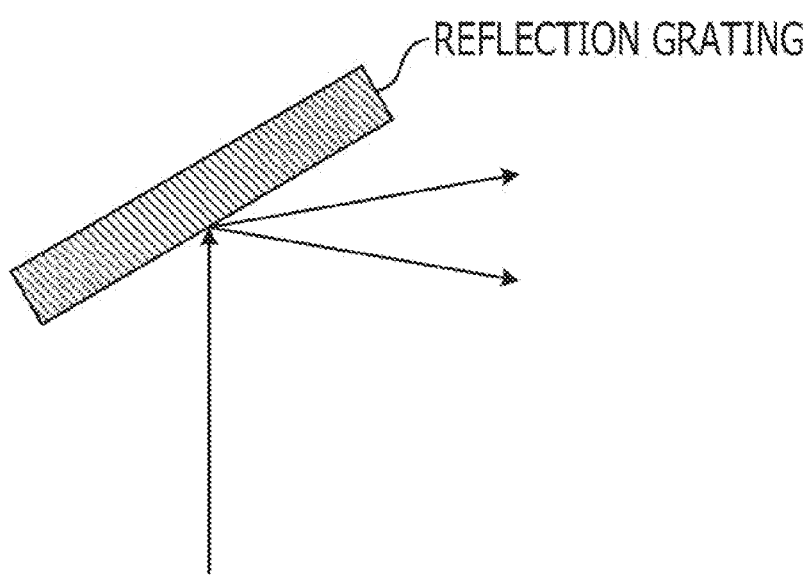

FIGS. 6A and 6B illustrate the wavelength demultiplexer 20. If the wavelength demultiplexer 20 has a transmission grating, the optical signal input via the first optical system 10 is demultiplexed according to wavelength while the optical signals are output as illustrated in FIG. 6A. If the wavelength demultiplexer 20 has a reflection grating, the optical signal input via the first optical system 10 is demultiplexed according to wavelength while the optical signals are output as illustrated in FIG. 6B.

Returning to the discussion of the wavelength selective switch of FIG. 4, the third optical system 30 separates the optical signals demultiplexed by the wavelength demultiplexer 20 into different directions in accordance with the directions of polarization planes. More specifically, the third optical system 30 separates, in different directions, the optical signal having the polarization direction aligned in a specific direction and the optical signal having the polarization direction aligned in a direction perpendicular to the specific direction.

Figure 7:
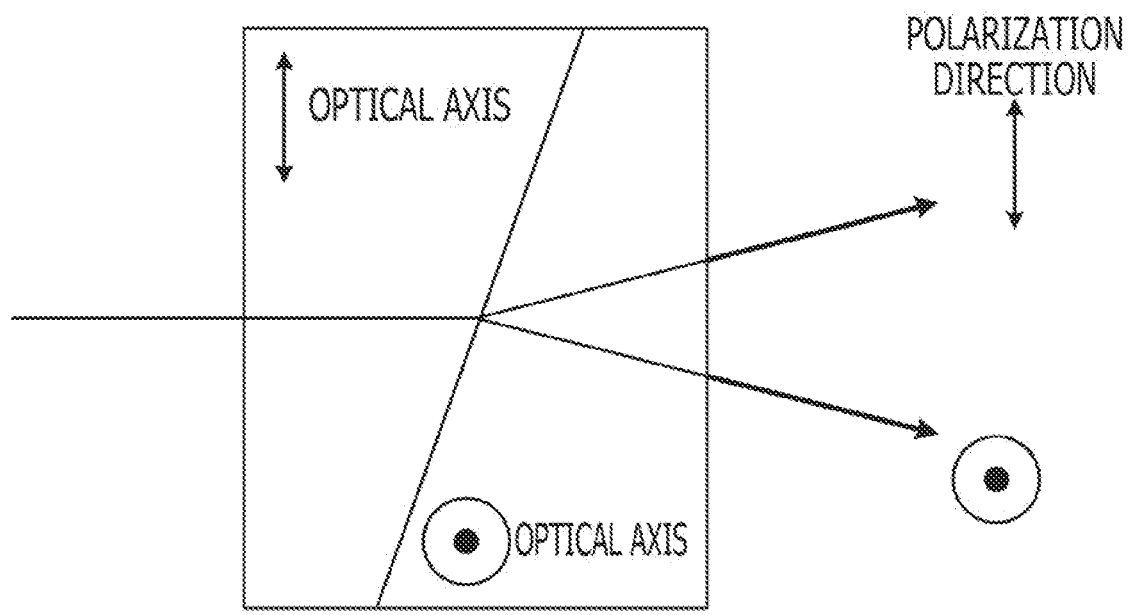
FIG. 7 illustrates a third optical system.

Discussed below is a process control of the third optical system 30 for controlling a traveling direction of the optical signal in response to the polarization direction. FIG. 7 illustrates the third optical system 30. FIG. 7 is a side view of the third optical system 30. Referring to FIG. 7, the third optical system 30 includes a double refraction crystal structure composed of two crystals with one crystal joining another crystal at a slant interface. One crystal has its optical axis vertical to the ground, and the other crystal has its optical axis parallel to the ground. As illustrated in FIG. 7, the third optical system 30 outputs in an upward direction the optical signal if the optical signal at the input state thereof has the polarization direction vertical to the ground. The third optical system 30 outputs in a downward direction the optical signal if the optical signal at the input state thereof has the polarization direction parallel to the ground.

For example, the third optical system 30 outputs in an upward direction the optical signal from WSS1 having a polarization direction vertical to the ground, and in a downward direction the optical signal from WSS2 having a polarization direction parallel to the ground. The third optical system 30 thus separates the optical signal of WSS1 and the optical signal of WSS2. Returning to the discussion of the wavelength selective switch of FIG. 4, the second optical system 40 collects the optical signals separated in the different directions by the third optical system 30. More specifically, the second optical system 40 has a lens, and collects the optical signal WSS1 output in the upward direction by the third optical system 30 and the optical signal of WSS2 output in the downward direction by the third optical system 30.

The optical signal reflector 50 reflects the optical signal collected the second optical system 40. The optical signal reflector 50, having MEMS mirrors, respectively reflects the optical signal collected by the second optical system 40. More specifically, the optical signal reflector 50 includes an MEMS mirror reflecting the optical signal of WSS1, and an MEMS mirror reflecting the optical signal of WSS2, and respectively reflects the optical signals toward the second optical system 40.

The reflection controller 60 controls the optical signal reflector 50 in response to the incident position of each optical signal incident on the optical signal reflector 50 such that the optical signal multiplexed in the first optical signal is output from the output port corresponding to the input port of WSS1. The reflection controller 60 controls the optical signal reflector 50 such that the optical signal multiplexed in the second optical signal is output from the output port corresponding to the input port of WSS2. More specifically, the reflection controller 60 controls the angles of the MEMS mirrors such that the wavelength-aligned optical signals multiplexed in the first optical signal and the second optical signal are output at specific losses from the output port of WSS1 and the output port of WSS2, respectively.

For example, the reflection controller 60 controls the angle of the MEMS mirror such that the optical signal input via each input port of WSS1 is output at a specific loss ratio from the output port of WSS1. More specifically, the reflection controller 60 controls the angle of the MEMS mirror such that the outputs of the wavelength-aligned optical signals of WSS1 are equalized and such that the optical signals are output from the output port of WSS1. For example, the reflection controller 60 controls the angle of the MEMS mirror such that the optical signal input via each input port of WSS2 is output at a specific loss ratio from the output port of WSS2. More specifically, the reflection controller 60 controls the angle of the MEMS mirror such that the outputs of the wavelength-aligned optical signals of WSS2 are equalized and such that the optical signals are output from the output port of WSS2.

Figure 8A:
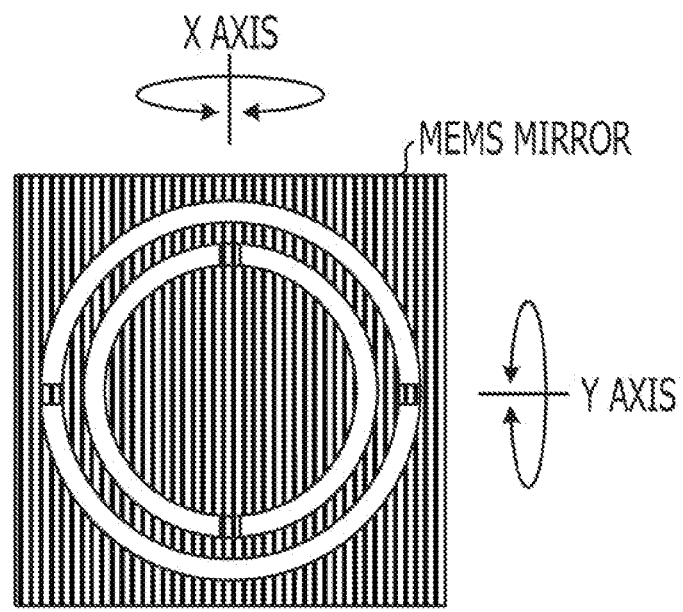
FIGS. 8A and 8B illustrate a reflection controller.
Figure 8B:
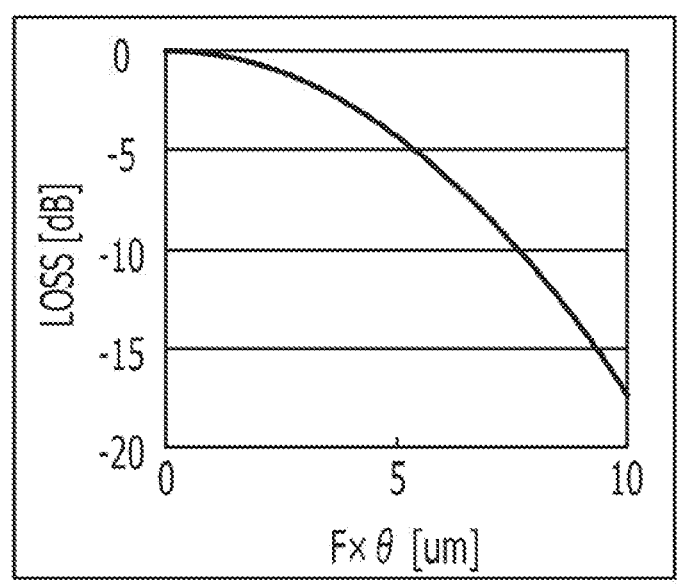

FIGS. 8A and 8B illustrate the reflection controller 60. With reference to FIG. 8A, the reflection controller 60 rotates the MEMS mirror about an X axis or a Y axis such that the outputs of the wavelength-aligned optical signals are equalized and such that the optical signals are output from the specific output port. The relationship between the angle of the MEMS mirror and the loss of the optical signal is discussed with reference to FIG. 8B. In FIG. 8B, the ordinate represents a loss (dB) of the optical signal and the abscissa represents a product of a focal length (F) of the second optical system and an angle (θ) of the MEMS mirror. Referring to FIG. 8B, the optical signal attenuates as the product of the focal length (F) of the second optical system and the angle (θ) of the MEMS mirror increases. Given the same focal length (F) of the second optical system, the optical signal attenuates as the angle (θ) of the MEMS mirror increases.

Process Of The Wavelength Selective Switch Of The Second Embodiment

The process of the wavelength selective switch of the second embodiment is described below with reference to FIG. 9. FIG. 9 illustrates the process of the wavelength selective switch of the second embodiment. Referring to FIG. 9, if an optical signal is input via an input port in the wavelength selective switch of the second embodiment (yes branch from step S101), the first optical system 10 aligns the polarization directions of the input optical signals (step S102). More specifically, the first optical system 10 aligns the polarization direction of the optical signal input via each input port of WSS1 in the specific direction, and aligns the polarization direction of the optical signal input via each input port of WSS2 in the direction perpendicular to the specific direction.

The wavelength demultiplexer 20 demultiplexes, according to wavelength, the optical path of the optical signals multiplexed in the first optical signal and the second optical signal having the polarization directions controlled by the first optical system 10 (step S103). More specifically, the wavelength demultiplexer 20, including one of the transmission grating and the reflection grating, demultiplexes the optical path of the optical signal input via each input port of WSS1 and the optical signal input via each input port of WSS2 into different optical paths according to wavelength.

The third optical system 30 separates the optical signals demultiplexed by the wavelength-demultiplexer 20 in accordance with the polarization direction (step S104). More specifically, the third optical system 30 separates into different traveling directions the first optical signal having the polarization direction aligned in the specific direction and the second optical signal having the polarization direction aligned in the direction perpendicular to the specific direction.

The second optical system 40 collects the optical signals demultiplexed by the wavelength-demultiplexer 20 and then separated by the third optical system 30 according to the polarization direction (step S105). The reflection controller 60 controls the optical signal reflector 50 to reflect the collected optical signal toward the respective output port (step S106). For example, the reflection controller 60 controls the optical signal reflector 50 such that the first optical signal is output from the output port of WSS1. The reflection controller 60 also controls the optical signal reflector 50 such that the second optical signal is output from the output port of WSS2.

The second optical system 40 collimates the optical signal reflected from the optical signal reflector 50 and outputs the collimated optical signal to the third optical system 30. The output ports of WSS1 and WSS2 output wavelength-multiplexed light input via the third optical system 30, the wavelength demultiplexer 20, and the first optical system 10 (step S107). The process thus ends.

Modifications of the wavelength demultiplexer 20 and the reflection controller 60 in the wavelength selective switch of the second embodiment are discussed with reference to FIGS. 10 and 11A and 11B. The wavelength selective switch of the second embodiment includes one of the transmission grating and the reflection grating, and demultiplexes the input optical signals according to wavelength. As described below, the polarization direction of the optical signal may be further controlled.

The wavelength demultiplexer 20 includes a first diffraction grating and a second diffraction grating, each made of one of the reflection grating and the transmission grating. The wavelength demultiplexer 20 controls the polarization direction of the first optical signal demultiplexed by the first diffraction grating so that the polarization direction of the first optical signal is aligned in a direction perpendicular to a specific direction. The wavelength demultiplexer 20 controls the polarization direction of the second optical signal demultiplexed by the first diffraction grating so that the polarization direction of the second optical signal is aligned in the specific direction. The wavelength demultiplexer 20 then directs to the second diffraction grating the first optical signal and the second optical signal having the polarization directions thereof aligned.

Figure 10:
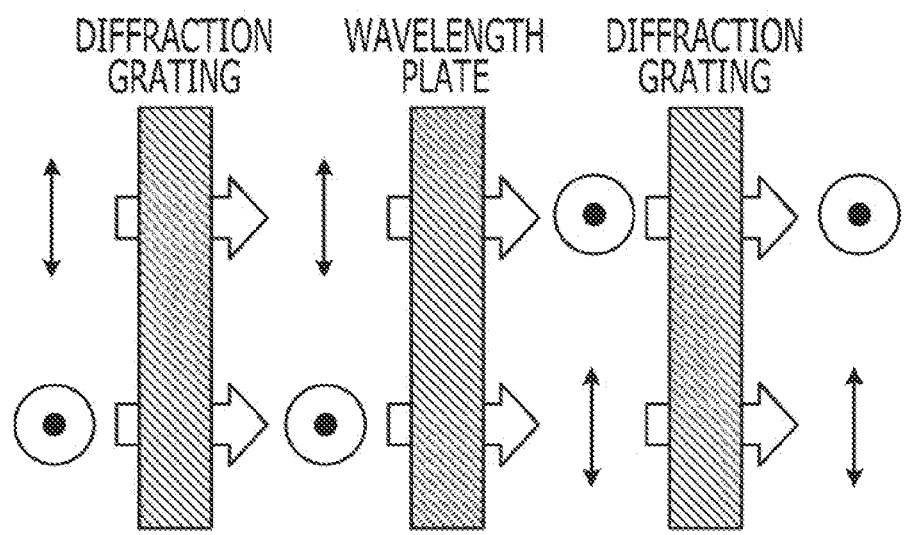
FIG. 10 illustrates a modification of the wavelength-demultiplexer.

FIG. 10 illustrates a modification of the wavelength selective switch. As illustrated in FIG. 10, the wavelength demultiplexer 20 includes a diffraction grating, a wavelength plate, and a diffraction grating, in that order, in the input direction of the optical signal, and controls the polarization direction of the first optical signal and the second optical signal. The wavelength plate arranged between the diffraction plates in the wavelength demultiplexer 20 rotates the first optical signal by 90 degrees from the polarization direction having been set to be vertical to the ground by the first optical system 10. Similarly, the wavelength plate arranged between the diffraction plates in the wavelength demultiplexer 20 rotates the second optical signal by 90 degrees from the polarization direction having been set to be parallel to the ground by the first optical system 10. More specifically, the first optical signal in a vertical direction to the ground and the second optical signal in a parallel direction to the ground are incident on the diffraction grating.

The reflection controller 60 in the wavelength selective switch of the second embodiment changes the angle of the MEMS mirror in the optical signal reflector 50, thereby controlling the loss to the optical signal. Alternatively, the wavelength selective switch may control the loss to the optical signal by controlling a liquid-crystal element. The optical signal reflector 50 may include the MEMS mirror and the liquid-crystal element. The reflection controller 60 thus controls the angle of the MEMS mirror such that the wavelength-aligned optical signals multiplexed in the first optical signal and the second optical signal are respectively output from the output port of WSS1 and the output port of WSS2. The reflection controller 60 further controls the liquid-crystal element such that the wavelength-aligned optical signal has a specific loss.

Figure 11A:
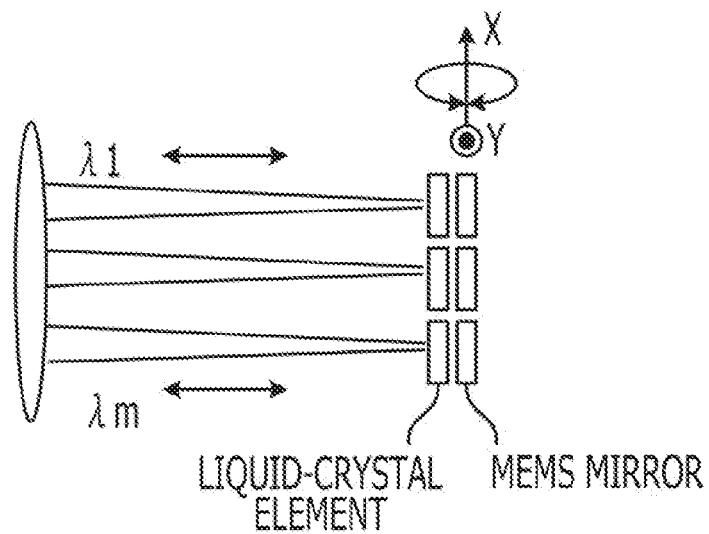
FIGS. 11A and 11B illustrate a modification of the reflection controller.
Figure 11B:
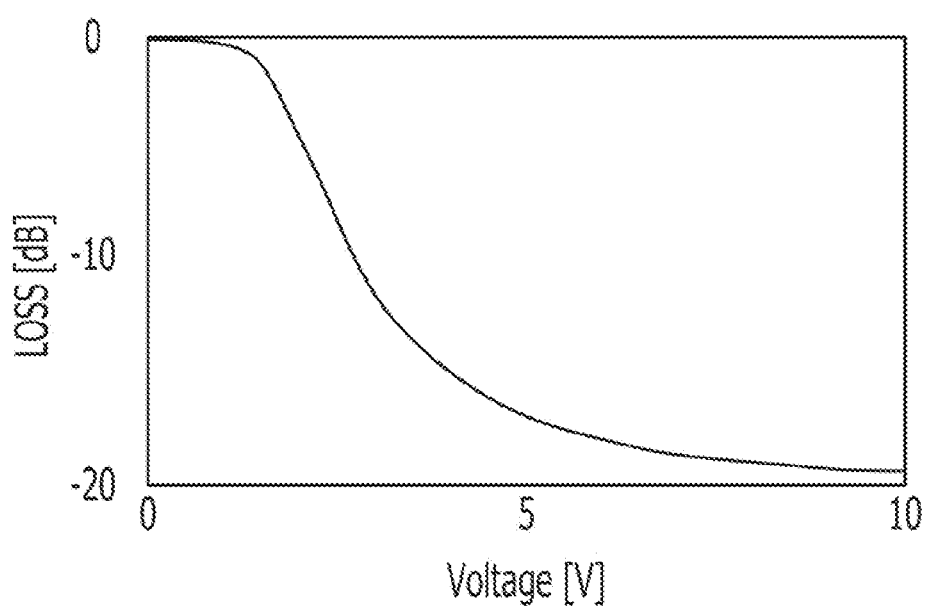

FIGS. 11A and 11B illustrate a modification of the reflection controller 60. Referring to FIG. 11A, the optical signal reflector 50 includes the liquid-crystal element and the MEMS mirror. The reflection controller 60 controls the output destination of the optical signal input from the second optical system 40 by rotating the MEMS mirror about the X axis. The reflection controller 60 controls the loss to the wavelength-aligned optical signal by applying a voltage to the liquid-crystal element arranged as illustrated in FIG. 11A.

The relationship between the voltage applied to the liquid-crystal element and the loss is discussed with reference to FIG. 11B. In FIG. 11B, the ordinate represents the loss (dB) to the optical signal, and the abscissa represents the applied voltage (V). As illustrated in FIG. 11B, the optical signal attenuates as the applied voltage increases.

Advantages Of The Second Embodiment

In accordance with the second embodiment, the first optical system 10 controls the polarization direction of the first optical signal as the wavelength-multiplexed light input via the input port of WSS1 such that the polarization direction of the first optical signal is aligned in a specific direction. The first optical system 10 controls the polarization direction of the second optical signal as the wavelength-multiplexed light input via the input port of WSS2 such that the polarization direction of the second optical signal is aligned in the direction perpendicular to the specific direction. The wavelength demultiplexer 20 demultiplexes according to wavelength the optical path of the optical signals multiplexed in the first optical signal and the second optical signal having the polarization directions controlled by the first optical system 10. The third optical system 30 then separates the optical signals, demultiplexed according to wavelength by the wavelength demultiplexer 20, into different directions. The second optical system 40 then collects the optical signals separated by the third optical system 30. The optical signal reflector 50 then reflects the optical signals collected by the second optical system 40. In response to the incident position of the optical signal incident on the optical signal reflector 50, the reflection controller 60 controls the optical signal reflector 50 such that the optical signal multiplexed in the first optical signal is output from the output port of WSS1. The reflection controller 60 controls the optical signal reflector 50 such that the optical signal multiplexed in the second optical signal is output from the output port of WSS2. Since the optical signal of WSS1 and the optical signal of WSS2 are reliably separated using the single wavelength demultiplexer 20 and the second optical system 40, two wavelength selective switches can be integrated. A device including a plurality of wavelength selective switches can be miniaturized. Optical components, such as a diffraction grating employed in a spatial optical system of the wavelength selective switch, are typically costly. The shared use of a single optical component reduces costs of the wavelength selective switch.

In accordance with the second embodiment, the optical signal reflector 50 includes the MEMS mirror, and the reflection controller 60 controls the angle of the MEMS mirror such that the wavelength-aligned optical signals multiplexed in the first optical signal and the second optical signal are respectively output at the specific losses from the output port of WSS1 and the output port of WSS2. The wavelength-multiplexed light with the light intensities of the wavelength-aligned optical signals equalized is thus output. The optical signals are reliably switched.

In accordance with the second embodiment, the optical signal reflector 50 includes the MEMS mirror and the liquid-crystal element, and the reflection controller 60 controls the angle of the MEMS mirror such that the wavelength-aligned optical signals multiplexed in the first optical signal and the second optical signal are output from the output port of WSS1 and the output port of WSS2. The reflection controller 60 controls the liquid-crystal element such that the wavelength-aligned optical signals have specific loss ratios. The light intensities of the wavelength-aligned optical signals are easily equalized.

In accordance with the second embodiment, the wavelength demultiplexer 20 wavelength-demultiplexes into different directions the optical path of the optical signals multiplexed in the first optical signal and the second optical signal through the reflection grating. The wavelength demultiplexing is thus performed at high light usage efficiency.

In accordance with the second embodiment, the wavelength demultiplexer 20 wavelength-demultiplexes in the different directions the optical path of the optical signals multiplexed in the first optical signal and the second optical signal through the transmission grating. Space occupied by the wavelength demultiplexer 20 is reduced, and the freedom of design of the optical system is increased.

In accordance with the second embodiment, the wavelength demultiplexer 20 includes the first diffraction grating and the second diffraction grating, each including a transmission grating and a reflection grating. The wavelength demultiplexer 20 controls the polarization direction of the first optical signal demultiplexed by the first diffraction grating such that the polarization direction of the first optical signal is aligned in the direction perpendicular to the specific direction. The wavelength demultiplexer 20 controls the polarization direction of the second optical signal demultiplexed by the first diffraction grating such that the polarization direction of the second optical signal is aligned in the specific direction. The wavelength demultiplexer 20 then causes the first optical signal and the second optical signal having the aligned polarization directions to be incident on the second diffraction grating. The optical signal demultiplexing is performed with a diffraction efficiency difference due to a difference of the polarization direction taken in to consideration Characteristics of the first optical signal and the second optical signal are thus equalized.

Figure 12A:
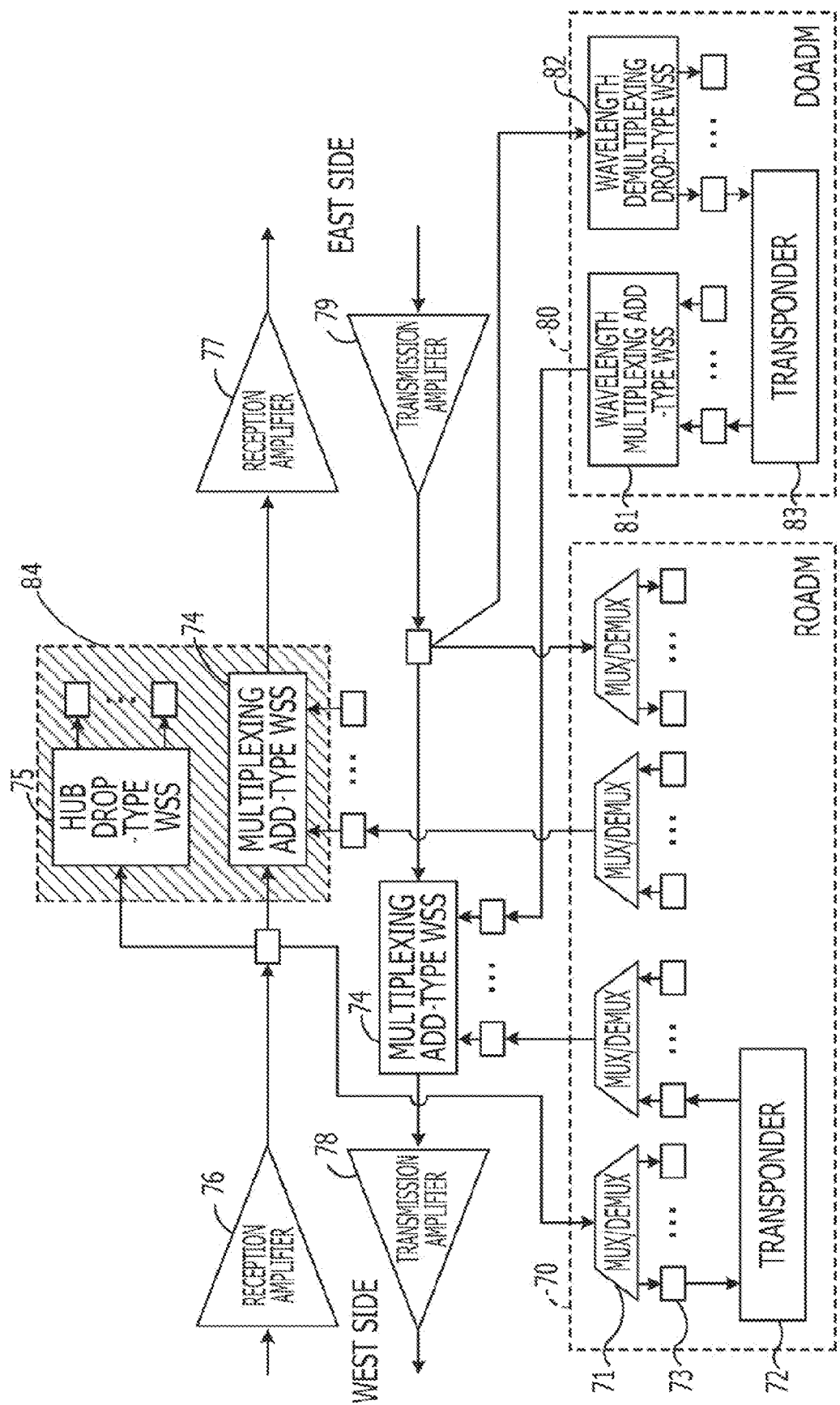

The two add-type WSS and WSS are integrated in the second embodiment. In accordance with a third embodiment, an add-type WSS and a drop-type WSS are integrated. FIGS. 12A and 12B illustrate a mounting position of a wavelength selective switch of the third embodiment. Referring to FIG. 12A, the wavelength selective switch of the third embodiment is mounted at the position of the hub drop-type WSS 75 and the multiplexing add-type WSS 74 of the optical transfer device of FIG. 2. More specifically, in accordance with the third embodiment, the multiplexing add-type WSS 74 and the hub drop-type WSS 75 are integrated in the optical transfer device and perform the functions of the multiplexing add-type WSS 74 and the hub drop-type WSS 75.

The hub drop-type WSS 75 at the mounting position of the wavelength selective switch of the third embodiment is described below. As illustrated in FIG. 12B, the hub drop-type WSS collimates an optical signal input via a single input port with the first optical system 10 and then causes the optical signal to be incident on the wavelength demultiplexer 20. The wavelength demultiplexer 20 in the hub drop-type WSS 75 demultiplexes the optical signal according to wavelength (wavelength: $\lambda 1$-$\lambda m$). The second optical system 40 in the hub drop-type WSS 75 collects the optical signals demultiplexed according to wavelength and causes the collected optical signals to be incident on the MEMS 50 having the MEMS mirrors. The hub drop-type WSS 75 then adjusts the angle of the MEMS mirror such that the optical signal having a specific wavelength is output from any of the output ports 1 through N. The optical signal is thus reflected.

Figure 13:
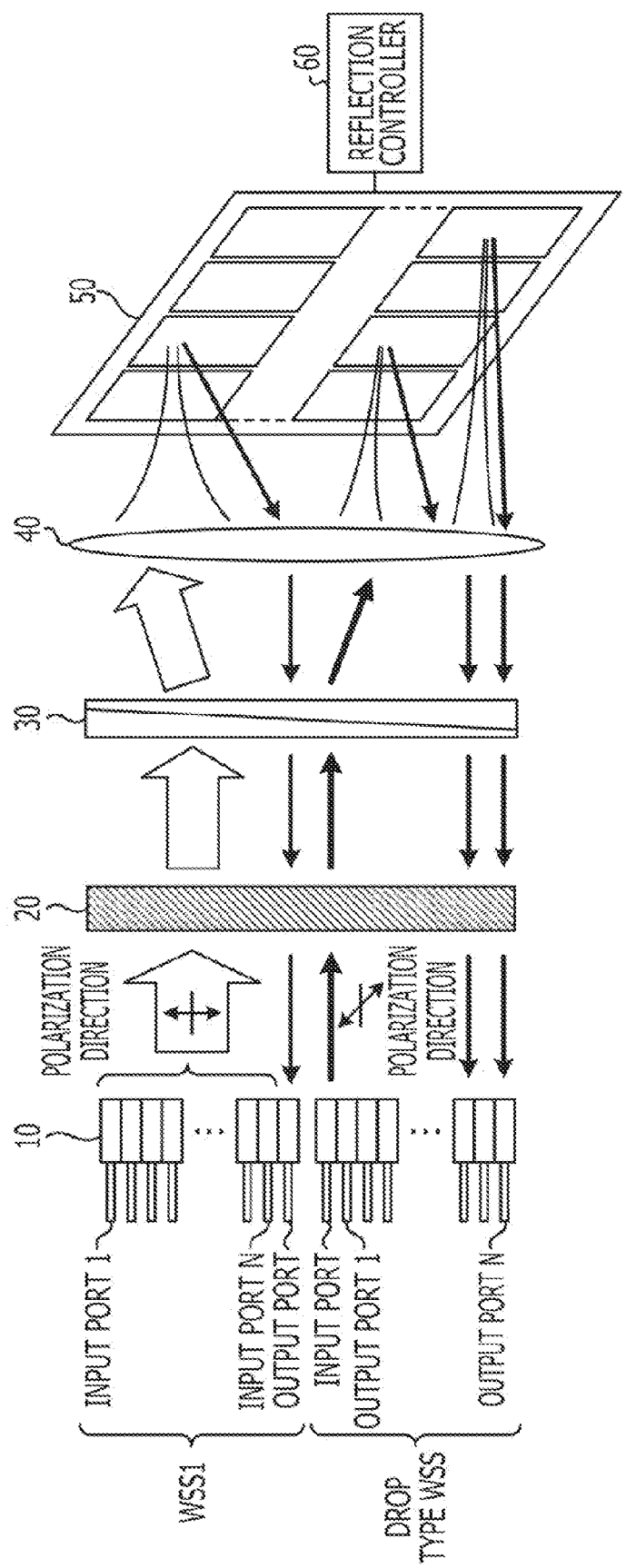
FIG. 13 illustrates a structure of the wavelength selective switch of the third embodiment.

The wavelength selective switch of the third embodiment is described with reference to FIG. 13. FIG. 13 illustrates a structure of the wavelength selective switch of the third embodiment. The wavelength selective switch illustrated in FIG. 13 is different from the wavelength selective switch illustrated in FIG. 4 in that WSS2 is a drop-type WSS having the function of the hub drop-type WSS 75. The drop-type WSS is mainly discussed below.

As illustrated in FIG. 13, the drop-type WSS of the wavelength selective switch includes a single input port and a plurality of output ports 1-N. An optical signal having a specific wavelength of wavelength-multiplexed light input via the input port is output from any of the output ports 1-N. The processes of the first optical system 10, the wavelength demultiplexer 20, the third optical system 30, the second optical system 40, the optical signal reflector 50, and the reflection controller 60 are identical to those of the counterparts in the second embodiment, and the discussion thereof is omitted here. The process of the wavelength selective switch of the third embodiment is also identical to the process of the wavelength selective switch in the second embodiment, and the discussion thereof is omitted here.

In accordance with the third embodiment, the wavelength selective switch into which the add-type WSS and the drop-type WSS are integrated is implemented. A variety of types of wavelength selective switches may be integrated in the optical transfer device, and the optical transfer device finds widespread applications.

The first through third embodiments have been discussed. The wavelength selective switch may be implemented in a variety of different embodiments. The variety of different embodiments are described below as modifications to the embodiments.

In accordance with the first through third embodiments, the multiplexing add-type WSS1 and the multiplexing add-type WSS2 illustrated in FIG. 2 are integrated, or the multiplexing add-type WSS1 and the hub drop-type WSS are integrated. The embodiments are not limited to this arrangement. The WSS and WSS illustrated in FIG. 2 may be integrated in a variety of combinations.

Figure 14B:
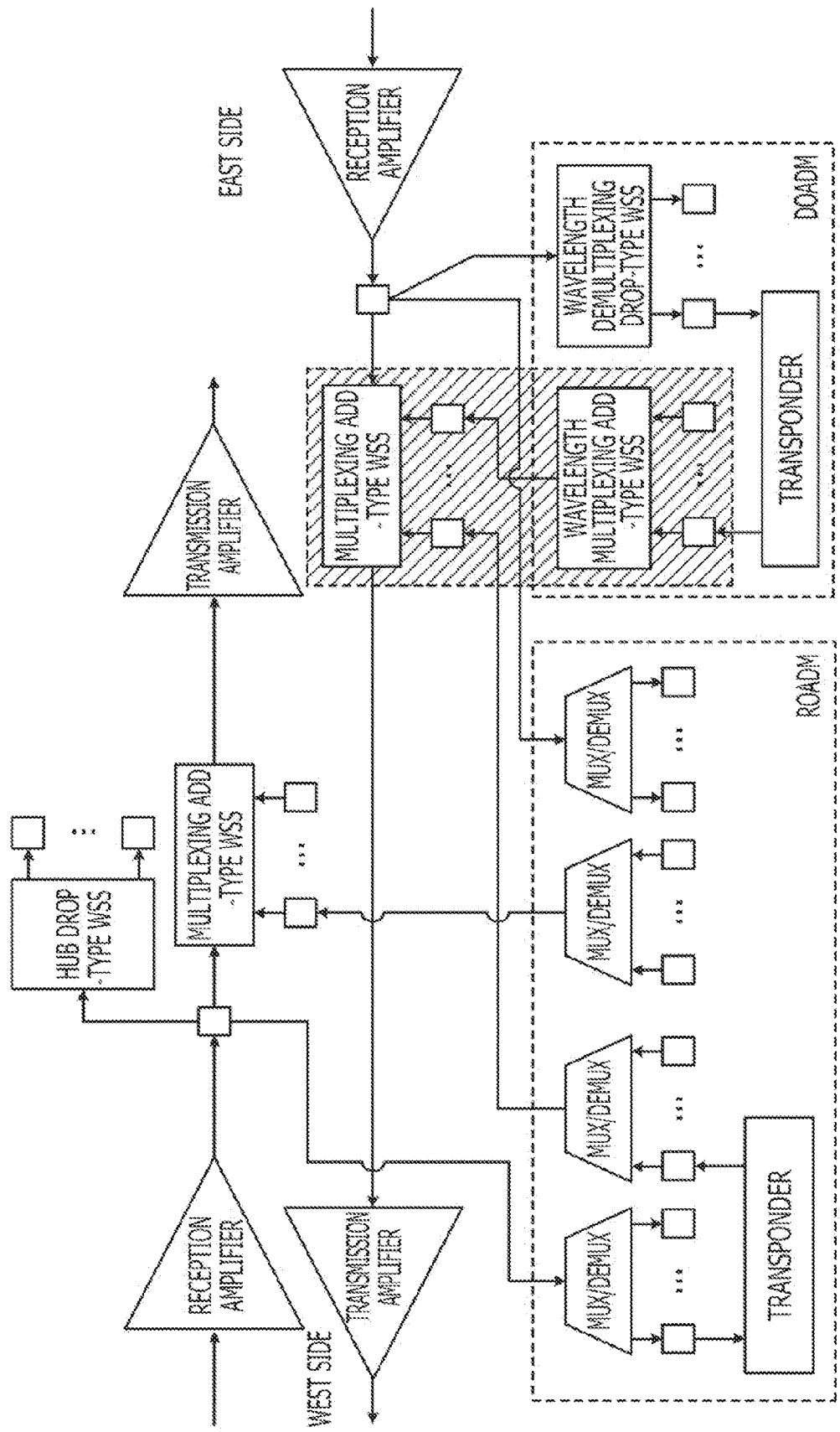
Figure 15A:
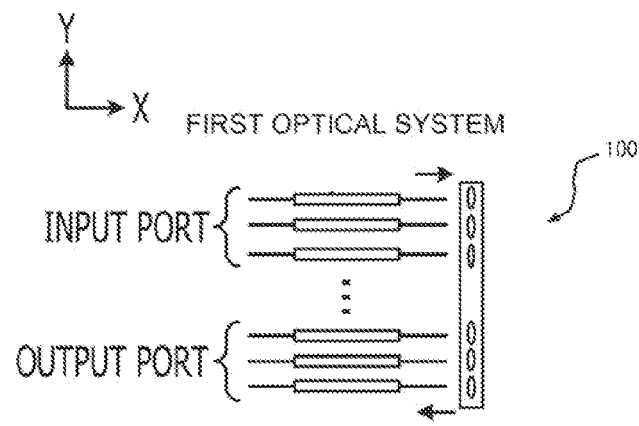
FIGS. 15A and 15B illustrate related art.
Figure 15B:
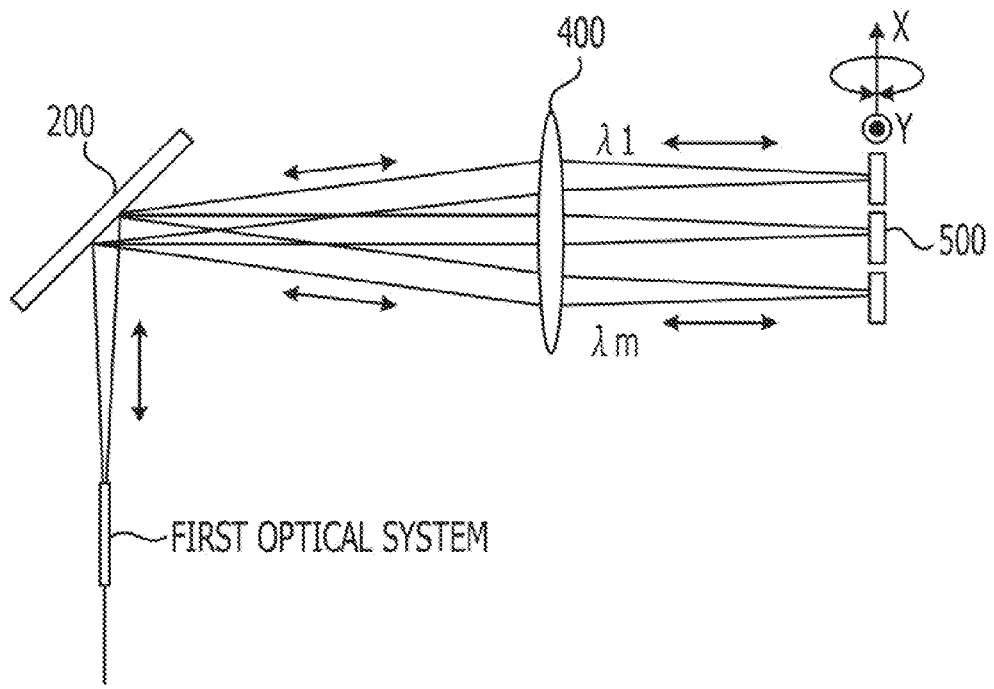

FIGS. 14A-14C illustrate modifications of the mounting of the wavelength selective switch. Referring to FIG. 14A, a multiplexing add-type WSS and a wavelength-demultiplexing drop-type WSS may be integrated as one modification to the wavelength selective switch. Referring to FIG. 14B, a multiplexing add-type WSS and a wavelength-multiplexing add-type WSS2 may be integrated as another modification of the wavelength selective switch. Referring to FIG. 14C, a wavelength-demultiplexing drop-type WSS and a wavelength-multiplexing add-type WSS2 may be integrated as yet another modification of the wavelength selective switch.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a illustrating of the superiority and inferiority of the invention. Although the embodiment has been described in detail, it should be understood that various changes, substitutions, and alterations could be made hereto without departing from the spirit and scope of the invention.

What is claimed is:

1. A wavelength selective switch, comprising:
    a polarization controller configured to control a polarization plane of a first optical signal as wavelength-multiplexed light input through a first input port, and to control a polarization plane of a second optical signal as wavelength-multiplexed light input through a second input port such that the polarization plane of the second optical signal is aligned in a direction different from the polarization plane of the first optical signal;
    a wavelength demultiplexer configured to wavelength-demultiplex optical signals wavelength multiplexed in the first optical signal and the second optical signal, the direction of the polarization plane of which is controlled by the polarization controller;
    a polarization separator configured to separate, according to the direction of the polarization plane, the optical signals wavelength-demultiplexed by the wavelength demultiplexer;
    an optical collector configured to collect the optical signals separated by the polarization separator;
    an optical signal reflector configured to reflect the optical signals collected by the optical collector; and
    a reflection controller configured to control the optical signal reflector in accordance with an incident position of the optical signal incident on the optical signal reflector such that the optical signal wavelength-multiplexed in the first optical signal is output from a first output port corresponding to the first input port and such that the optical signal wavelength-multiplexed in the second optical signal is output from a second output port corresponding to the second input port.

2. The wavelength selective switch according to claim 1, wherein the optical signal reflector comprises a micro-electromechanical system (MEMS) mirror, and
    wherein the reflection controller controls an angle of the MEMS mirror such that the wavelength-aligned optical signals wavelength-multiplexed in the first optical signal and the second optical signal are respectively output from the first output port and the second output port at specific losses.

3. The wavelength selective switch according to claim 1, wherein the optical signal reflector comprises a micro-electromechanical system (MEMS) mirror, and a liquid-crystal element, and
    wherein the reflection controller controls an angle of the MEMS mirror such that the wavelength-aligned optical signals wavelength-multiplexed in the first optical signal and the second optical signal are respectively output from the first output port and the second output port, and the reflection controller controls the liquid-crystal element such that the wavelength-aligned optical signals have specific losses thereof.

4. The wavelength selective switch according to claim 1, wherein the wavelength demultiplexer wavelength-demultiplexes the optical path of the optical signals wavelength-multiplexed in the first optical signal and the second optical signal into different directions through a reflection grating.

5. The wavelength selective switch according to claim 1, wherein the wavelength demultiplexer wavelength-demultiplexes the optical path of the optical signals wavelength-multiplexed in the first optical signal and the second optical signal into different directions through a transmission grating.

6. The wavelength selective switch according to claim 1, wherein the wavelength demultiplexer comprises a first diffraction grating and a second diffraction grating, each diffraction gating made of a reflection grating or a transmission grating, which controls the polarization plane of the first optical signal demultiplexed by the first diffraction grating such that the polarization plane of the first optical signal is aligned in the direction perpendicular to the specific direction, controls the polarization plane of the second optical signal demultiplexed by the first diffraction grating such that the polarization plane of the second optical signal is aligned in the specific direction, and causes the first optical signal and the second optical signal having the aligned polarization planes to be incident on the second diffraction grating.

7. An optical transfer device, comprising a wavelength selective switch, the wavelength selective switch including:
a polarization controller configured to control a polarization plane of a first optical signal as wavelength-multiplexed light input through a first input port, and control a polarization plane of a second optical signal as wavelength-multiplexed light input through a second input port such that the polarization plane of the second optical signal is aligned in a direction perpendicular to the polarization plane of the first optical signal;
a wavelength demultiplexer configured to wavelength-demultiplex, an optical path of optical signals wavelength-multiplexed in the first optical signal and the second optical signal, the direction of the polarization plane of which is controlled by the polarization controller;
a polarization separator configured to separate, according to the direction of the polarization plane, the optical signals wavelength-demultiplexed by the wavelength demultiplexer;
an optical collector configured to collect the optical signals separated by the polarization separator;
an optical signal reflector configured to reflect each of the optical signals collected by the optical collector; and
a reflection controller configured to control the optical signal reflector in accordance with an incident position of the optical signal incident on the optical signal reflector such that the optical signal wavelength-multiplexed in the first optical signal is output from a first output port corresponding to the first input port and such that the optical signal wavelength-multiplexed in the second optical signal is output from a second output port corresponding to the second input port.

8. The optical transfer device according to claim 7, wherein the optical signal reflector comprises a micro-electromechanical system (MEMS) mirror, and
wherein the reflection controller controls an angle of the MEMS mirror such that the wavelength-aligned optical signals wavelength-multiplexed in the first optical signal and the second optical signal are respectively output from the first output port and the second output port at specific losses.

9. The optical transfer device according to claim 7, wherein the optical signal reflector comprises a micro-electromechanical system (MEMS) mirror, and a liquid-crystal element, and
wherein the reflection controller controls an angle of the MEMS mirror such that the wavelength-aligned optical signals wavelength-multiplexed in the first optical signal and the second optical signal are respectively output from the first output port and the second output port, and the reflection controller controls the liquid-crystal element such that the wavelength-aligned optical signals have specific losses thereof.

10. The optical transfer device according to claim 7, wherein the wavelength demultiplexer wavelength-demultiplexes the optical path of the optical signals wavelength-multiplexed in the first optical signal and the second optical signal into different directions through a reflection grating.

11. The optical transfer device according to claim 7, wherein the wavelength demultiplexer wavelength-demultiplexes the optical path of the optical signals wavelength-multiplexed in the first optical signal and the second optical signal into different directions through a transmission grating.

12. The optical transfer device according to claim 7, wherein the wavelength demultiplexer comprises a first diffraction grating and a second diffraction grating, each grating made of a reflection grating or a transmission grating, which controls the polarization plane of the first optical signal demultiplexed by the first diffraction grating such that the polarization plane of the first optical signal is aligned in the direction perpendicular to the specific direction, controls the polarization plane of the second optical signal demultiplexed by the first diffraction grating such that the polarization plane of the second optical signal is aligned in the specific direction, and causes the first optical signal and the second optical signal having the aligned polarization planes to be incident on the second diffraction grating.

* * * * *